Figure 1:
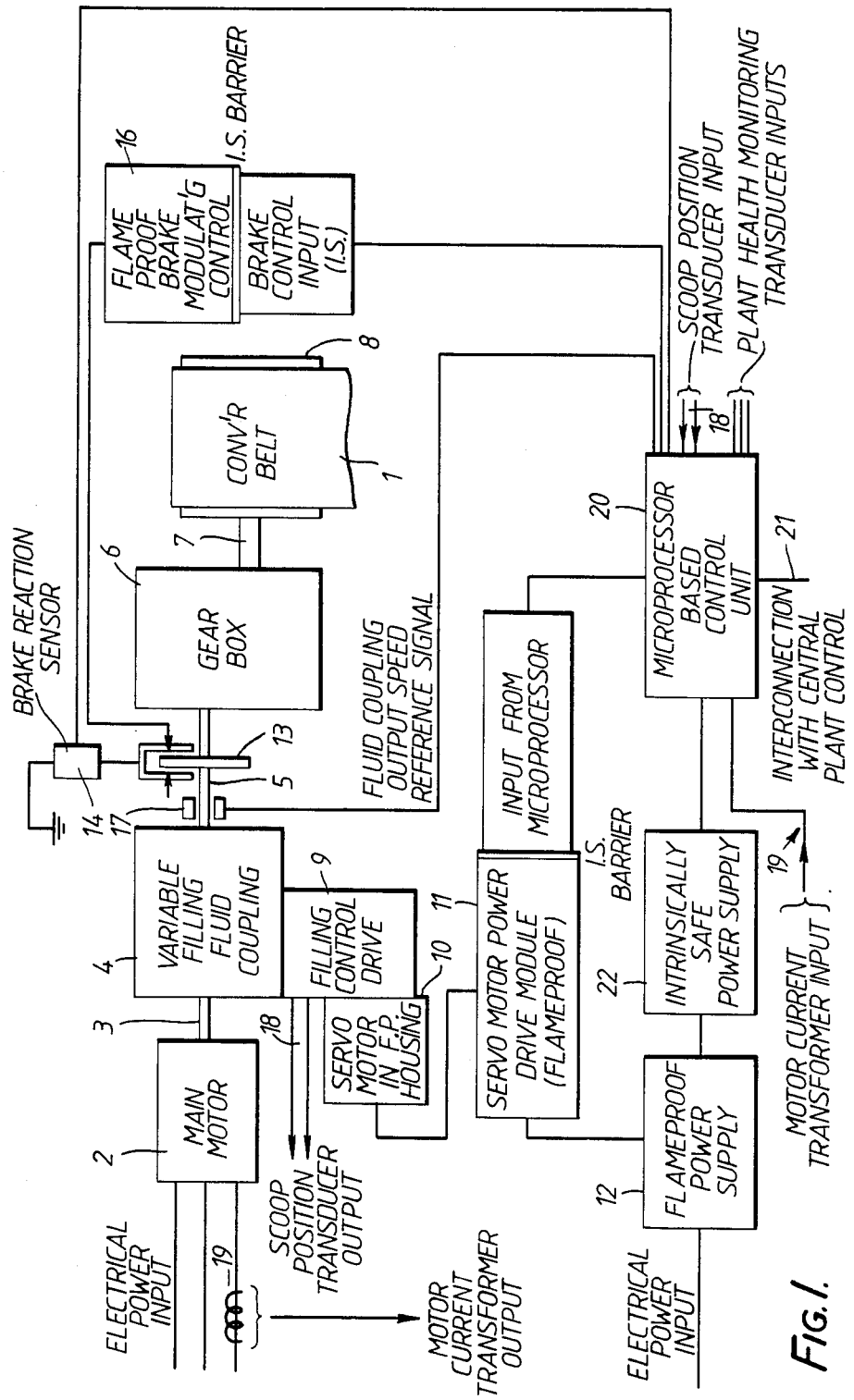

United States Patent [19]

Elderton

[11] Patent Number: 4,715,491
[45] Date of Patent: Dec. 29, 1987

[54] HIGH INERTIA LOAD DRIVES AND CONTROLS THEREFOR

[75] Inventor: John Elderton, Hampton Hill, England

[73] Assignee: AE PLC, Rugby, England

[21] Appl. No.: 809,886

[22] PCT Filed: Apr. 25, 1985

[86] PCT No.: PCT/GB85/00177

§ 371 Date: Dec. 2, 1985

§ 102(e) Date: Dec. 2, 1985

[87] PCT Pub. No.: WO85/05088

PCT Pub. Date: Nov. 21, 1985

[30] Foreign Application Priority Data

Apr. 30, 1984 [GB] United Kingdom ................ 8411019

[51] Int. Cl.[4] .................... F16D 67/06; B60K 41/28
[52] U.S. Cl. ................................ 198/856; 192/0.094
[58] Field of Search .............. 198/856, 855, 854, 832, 198/834, 835; 192/0.094, 2, 12 D, 18 B, 4 R; 74/336 R, 752 C, 752 D; 60/435; 188/181 T

[56] References Cited

U.S. PATENT DOCUMENTS 4,223,775  9/1980  Lloyd ................................ 198/855
4,568,611  9/1979  Woyton et al. .................... 198/855

Primary Examiner—James B. Marbert
Attorney, Agent, or Firm—William R. Hinds

[57] ABSTRACT

A drive system is described for driving high-inertia loads such as, for example, conveyor belts for carrying minerals in mines, quarries, etc. The drive system for a high inertia load comprises a prime mover, a brake for holding the load stationary, reaction sensing means for indicating the reaction exerted by the brake on the load, a variable filling fluid coupling having its input connected to the prime mover and its output connected to the brake and load, the coupling having filling control means responsive to external control signals for starting and stopping the load, the control means being responsive to the brake reaction sensor and to the speed of the load in such a manner as, on receipt of a start-up signal, to release the brake under control such as to maintain a desired acceleration rate, and to start filling the fluid coupling such that the effect of such filling lags behind the restraining torque of the brake if the load is acting on it in the forward direction, but if the load is acting in the backward direction to maintain the brake engaged and cause the filling control means to increase the filling of the coupling until the driving torque exerted through the coupling reduces or eliminates the backward reaction sensed by the brake reaction sensor and thereafter to release the brake and progressively increase the coupling filling while monitoring the transmitted torque, until the working speed is attained, the control means being responsive to a stop signal to progressively reduce the coupling filling and to apply the brake while monitoring the torque exerted on the load to maintain it below a predetermined value.

16 Claims, 2 Drawing Figures

HIGH INERTIA LOAD DRIVES AND CONTROLS THEREFOR

The present invention relates to high-inertia load drives, for example, for driving long conveyor belts for conveying minerals such as coal.

Conveyor belts of the type used for mining and quarrying operations may be up to many kilometers in length over 2½ m in width. As such the belt itself represents a considerable financial investment and must be protected by appropriate controls on the machinery used to drive the conveyor belt. It is well known to use fluid couplings between a prime mover such as, for example, an electric motor and the conveyor belt drive itself, the fluid coupling being used to give a soft start and for its inherent ability to insulate the belt from shock loadings produced by the prime mover. One known control system is described by Lloyd in U.S. Pat. No. 4,223,775 where essentially a memory device stores and continuously updates the level of motor demand power from which data the application of conveyor braking on shut-down and release of brakes on start-up may be controlled. A problem with this is that the system is not capable of allowing for variation in conveyor loading during operation. Thus if the control is programmed for accelerating a loaded conveyor then a lightly loaded or empty conveyor will be accelerated much more rapidly. A consequence of this may be that in some conveyor geometries there is a risk of the material on the conveyor being spilled or of the belt being lifted off the idlers at transitions between horizontal and upwardly inclined conveyor sections. Similarly, there may be a requirement in some installations where it is necessary to limit the acceleration of a downwardly inclined and loaded belt during start-up and apply controlled braking perhaps, for example, to prevent overspeeding of the belt and bunching at changes of belt gradient. It may also be the case that in complex installations where individual conveyors discharge material on to and receive material from other conveyors it is necessary to start or stop all the conveyors in the same time period regardless of individual load and other parameters. In this way the loss of production time usually associated with running-off conveyor loads in sequence prior to shut-doown and running the material back on to each conveyor belt again on start-up may be avoided.

The control described by Lloyd in U.S. Pat. No. 4,223,775 is not able to accomplish the above requirements in that it cannot control the case where a conveyor is attempting to accelerate on a downwardly directed incline under gravity. It also cannot stop or start multiple variably loaded conveyors within the same time period, since there is no closed loop feedback of conveyor speed during these phases.

It is an object of the present invention to provide a drive and control system for a conveyor system which is able to accelerate a conveyor to a required speed within a predetermined time period or to brake it to rest within a predetermined, perhaps different, time period regardless of load. It is another object to provide drive and control systems for multiple conveyors which are able to start up or stop within a desired time period regardless of conveyor loading.

According to the present invention, there is provided a drive and control system for driving a high-inertia load from a prime mover, comprising a brake for holding the load stationary, reaction sensing means for indicating the reaction exerted by the brake on the load, a variable filling fluid coupling having its input connected to the prime mover and its output connected to the brake and load, the coupling having filling control means responsive to external control signals for starting and stopping the load, the filling control means being responsive to the brake reaction sensor and to the speed of the load in such a manner as, on receipt of a start-up signal, to release the brake under control such as to maintain a desired acceleration rate, and to start filling the fluid coupling such that the effect of such filling lags behind the restraining torque of the brake if the load is acting on it in the forward direction but if the load is acting in the backward direction to maintain the brake engaged and cause the filling control means to increase the filling of the coupling until the driving torque exerted through the coupling reduces or eliminates the backward reaction sensed by the brake reaction sensor and thereafter to release the brake and progressively increase the coupling filling while monitoring the transmitted torque, until the working speed is attained, the control means being responsive to a stop signal to progressively reduce the coupling filling and to apply the brake while monitoring the torque exerted on the load to maintain it below a predetermined value.

Where the load is a long conveyor belt with portions of different gradient it may happen that part of the belt run is still loaded from previous operations while other parts are unloaded. As the loaded portion moves from one gradient to another during start-up or shut-down, the torque on the drive will vary in magnitude and possibly direction (especially when a loaded portion reaches a downhill gradient). When such a condition is sensed during start-up by sensing a change in the sign of the torque, the drive control causes the filling control means to reduce temporarily the coupling filling to avoid overloading the conveyor belt.

The present invention provides full proportional control of the drive to the conveyor irrespective of the belt loading. By being able to start-up or stop multiple variably loaded conveyors all within a predetermined time period it is possible to control a complete conveyor system from a central plant control station with attendant economic benefits due to reduced labour requirements.

The variable filling fluid coupling may, for example, be of the variable scoop type or of the pump filling type.

Figure 2:
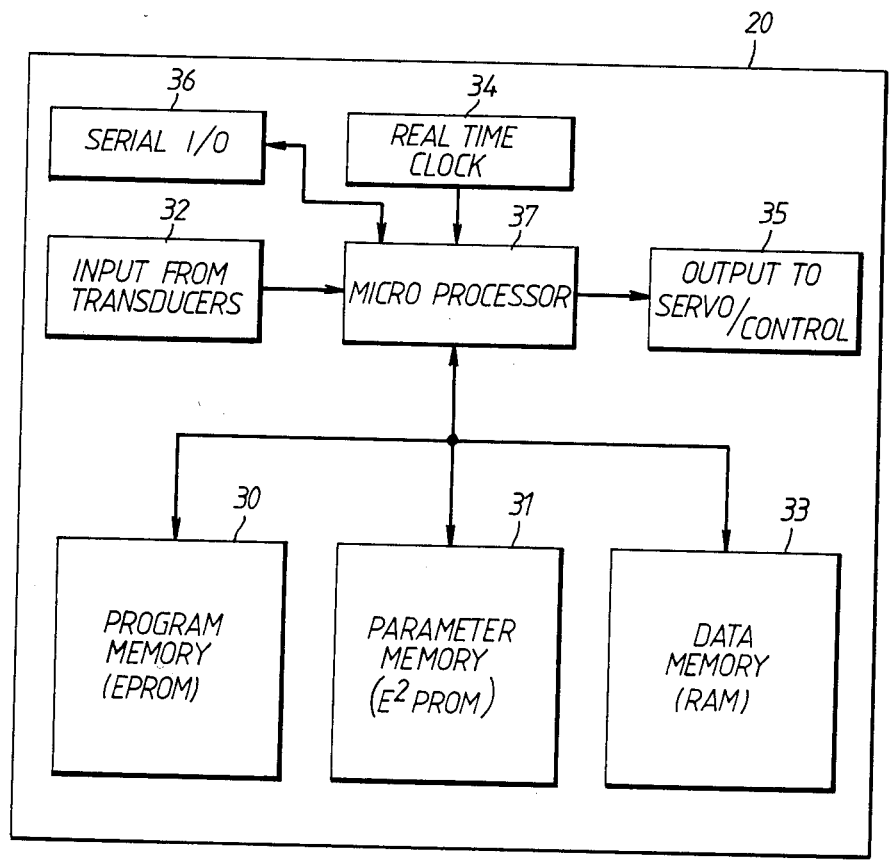

The invention will now be further described by way of example with reference to the accompanying drawings, of which:

FIG. 1 shows diagrammatically the main components of a conveyor belt drive system in accordance with the present invention and FIG. 2 which shows diagrammatically the system elements contained within the microprocessor control unit of FIG. 1.

Referring now to FIG. 1 and where the conveyor belt drive system shown serves for driving a coal conveyor belt 1 in an underground coal mine. The drive includes a prime mover 2 in the form of a constant speed three-phase electric induction motor, the output shaft 3 of which drives the impeller or pump element of a variable filling fluid coupling 4 for example of the scoop control type. The runner or turbine element of the coupling 4 drives a shaft 5 coupled to the input shaft of a reduction gear box 6 having an output shaft 7 carrying a driving pulley 8 for the conveyor belt 1.

The variable filling coupling 4 has a filling control 9 operated by a servo motor 10 in a flameproof housing. The servo motor 10 is controlled by a servo motor power drive module 11 in a flameproof housing, the module 11 attaining the necessary power supply for the servomotor 10 from a flameproof power supply 12.

A disc brake 13 is mounted on the shaft 5 and includes a brake reaction sensor 14, for example in the form of a strain gauge mounted in its housing, for indicating the direction and magnitude of the torque exerted by the brake 13 on the shaft 5 when the brake 13 is engaged. Operation of the brake 13 is controlled by a brake modulating control 16 in a flameproof housing.

A tachometer 17 monitors the rotational speed of the shaft 5. A transducer 18 provides an output representative of the position of the filling control member 9 of the fluid coupling 4. The torque in the shafts 3 and 5 is indicated by a current sensing transformer winding 19 around one of the supply leads of the motor 2.

Control of the operation of the drive system is effected by means of a microprocessor based control unit 20 to which start-up and shut-down signals are supplied from a central plant control 23 (not shown) through a cable 21.

Referring now to FIG. 2 which shows the system elements of the microprocessor control unit 20 in more detail. The control unit 20 contains a program memory 30 which stores the operating system programs and control laws for the control unit 20. A parameter memory 31 contains the parameter constants which act on the signals from the transducer inputs unit shown as 32. A data memory 33 stores collected data from the various drive system transducers required by the control unit 20. A real-time clock 34 is used to synchronise further control units 40,50 etc. (not shown) similar to unit 20 which may be distributed along the conveyor for future development of power sharing of multiple fluid couplings. A servo/control output module 35 controls the fluid coupling servo motor power drive module 11 and brake control 16. A serial input/output interface 36 provides for external control and data capture from the central plant control 23 (not shown) through the cable 21. Operation of the unit 20 is controlled by a central microprocessor 37.

The outputs of the brake reaction sensor 14, tachometer 17, scoop position transducer 18 and transformer winding 19 are all fed into the microprocessor control unit 20 together with any other required signals representative of the correct operation of other parts of the plant. These signals are all conditioned into the required format by the transducer inputs unit 32.

The microprocessor control unit 20 is a low voltage unit which is powered by an intrinsically safe low voltage power supply 22. Outputs from the microprocessor control unit 20 are conveyed through appropriate cables, depending on the control system and transducer status to the drive module 11 for the filling control drive 9 for the coupling 4, and the brake modulating control 16 for the brake 13.

In operation, the motor 2 will be kept running except in the case of prolonged shut-down. When the conveyor belt is at rest, the brake 13 will be engaged to prevent any accidental movement of the belt 1. When it is required to drive the belt 1, an appropriate signal is fed into the microprocessor control unit 20 through the serial input/output interface 36 via the cable 21 to initiate both start-up and shut-down routines.

The control unit 20 first ascertains the direction of the reaction sensed by the brake sensor 14. If the load on the belt is tending to drive it in the forward direction, the control unit 20 causes the brake 13 to be gradually released, but still preventing uncontrolled acceleration, and thereafter causes the module 11 to drive the servo motor 10 to start to move the filling control member to fill coupling 4 but without transmitting any substantially forward torque. Once the coupling is full the acceleration of the load will be controlled by regenerative braking by the electric motor and the brake is, at that stage, fully released. If, however, the load on the conveyor belt 1 is tending to drive the latter backwards, the control unit 20 keeps the brake 13 engaged while causing the drive 9 to start to fill the coupling. As the degree of filling of the coupling increases, the torque transmitted through it from the motor 2 increases to a value equal to the torque exerted by the conveyor belt 1. The torque sensed by the sensor 14 thus drops substantially to zero and in response to this, the control unit 20 causes the brake 13 to be released under the control of the processor stored algorithm. In either event, the motor 2 is now beginning to drive the conveyor belt 1 in the forward direction.

Once the brake 13 has been released, the control unit 20 senses the driving torque exerted by the motor 2 by means of the transformer winding 19 and controls the operation of the filling control drive 9 to prevent excessive loads on the conveyor belt 1 and motor 2. In particular, the control unit 20 monitors the rate of change of the acceleration of the shaft 5 and thus of the belt 1 by means of the tachometer 17.

When the shut-down signal is received through the cable 21, the control unit 20 causes the filling control drive 9 to operate to reduce the degree of filling of the coupling 4 to produce a controlled deceleration of the belt 1 and monitored by the tachometer 17. If the required deceleration of the belt is not achieved, the control unit 20 applies the brake 13 to the appropriate extent required to bring the conveyor belt 1 to rest without excessive deceleration.

In large installations which will have several driving motors 2 distributed along the path of the belt, one control unit 20 may be arranged to be a master control unit and be connected to synchronise the operation of the other control units. An essential requirement of this is that all control units are synchronous with the Master Control Unit and with each other. For this purpose the real-time clock 34 inside each control unit 20 will be used. Each control unit 20 is initially set up with the same time-code and will run independently from each other unit. As the real-time clock has a very accurate clock frequency each unit will therefore remain in synchronisation with each other; this will ensure substantially uniform acceleration or deceleration of the respective drive pulleys 8. This may be further achieved by ensuring that the currents sensed by each of the transformer windings 19 is the same for all of the drives.

The real-time clock 34 will also be used to log-in transducer events in real time, therefore giving the ability to record when events occurred. These would be held in the data memory 33.

Although the invention has been described with reference to, for example, servo motor drive to the filling control, it will be appreciated that any known methods or apparatus may be employed for such features. Linear actuators may, for example, be substituted for servvo motors.

Where proportional speed or torque control is desirable the present invention may, for example, be utilised in driving variable speed fans or pumps.

I claim:

1. Apparatus for driving a high-inertia load from a prime mover, the apparatus comprising a brake for holding the load stationary, reaction sensing means for indicating the reaction exerted by the brake on the load, a variable filling fluid coupling having its input connected to the prime mover and its output connected to the brake and load, the coupling having filling control means responsive to external control signals for starting and stopping the load, the filling control means being responsive to the brake reaction sensor and to the speed of the load in such a manner as, on receipt of a start-up signal, to release the brake under control such as to maintain a desired acceleration rate, and to start filling the fluid coupling such that the effect of such filling lags behind the restraining torque of the brake if the load is acting on it in the forward direction, but if the load is acting in the backward direction to maintain the brake engaged and cause the filling control means to increase the filling of the coupling until the driving torque exerted through the coupling reduces or eliminates the backward reaction sensed by the brake reaction sensor and thereafter to release the brake and progressively increase the coupling filling while monitoring the transmitted torque, until the working speed is attained, the control means being responsive to a stop signal to progressively reduce the coupling filling and to apply the brake while monitoring the torque exerted on the load to maintain it below a predetermined value.

2. Apparatus according to claim 1 and wherein the prime mover is an electric motor.

3. Apparatus according to either claim 1 and wherein the high-intertia load is a conveyor belt.

4. Apparatus according to claim 1 and wherein the variable filling fluid coupling is of the scoop control type.

5. Apparatus according to claim 1 and wherein the filling control means, drive control means are responsive to a microprocessor control unit.

6. Apparatus according to claim 2 and wherein the high-inertia load is a conveyor belt.

7. Apparatus according to claim 2 and wherein the variable filling fluid coupling is of the scoop control type.

8. Apparatus according to claim 3 and wherein the variable filling fluid coupling is of the scoop control type.

9. Apparatus according to claim 6 and wherein the variable filling fluid coupling is of the scoop control type.

10. Apparatus according to claim 2 and wherein the filling control means, drive control means are responsive to a microprocessor control unit.

11. Apparatus according to claim 3 and wherein the filling control means, drive control means are responsive to a microprocessor control unit.

12. Apparatus according to claim 4 and wherein the filling control means, drive control means are responsive to a microprocessor control unit.

13. Apparatus according to claim 6 and wherein the filling control means, drive control means are responsive to a microprocessor control unit.

14. Apparatus according to claim 7 and wherein the filling control means, drive control means are responsive to a microprocessor control unit.

15. Apparatus according to claim 8 and wherein the filling control means, drive control means are responsive to a microprocessor control unit.

16. Apparatus according to claim 9 and wherein the filling control means, drive control means are responsive to a microprocessor control unit.

* * * * *